US012050005B1

(12) United States Patent
Ma et al.

(10) Patent No.: US 12,050,005 B1
(45) Date of Patent: Jul. 30, 2024

(54) CONVENIENT AND EASY-TO-USE LED LUMINAIRE CAPABLE OF ADJUSTING ILLUMINATION ANGLE OF LIGHT SOURCE IN COMBINED MANNER

(71) Applicants: Shenzhen QianHai Dreamlink Technology Co., Ltd., Shenzhen (CN); Daoxian Jingwei Electronics Co., Ltd., Yongzhou (CN)

(72) Inventors: Yong Ma, Shenzhen (CN); Jian Liang, Shenzhen (CN)

(73) Assignees: Shen Zhen QianHai Dreamlink Technology Co., Ltd, Shenzhen (CN); Daoxian Jingwei Electronics Co., Ltd, Yongzhou (CN)

( * ) Notice: Subject to any disclaimer, the term of this patent is extended or adjusted under 35 U.S.C. 154(b) by 0 days.

(21) Appl. No.: 18/228,691

(22) Filed: Aug. 1, 2023

(51) Int. Cl.
| | | |
|---|---|---|
| *F21V 21/14* | (2006.01) | |
| *F21V 5/00* | (2018.01) | |
| *F21V 17/10* | (2006.01) | |
| *F21V 21/15* | (2006.01) | |
| *F21Y 113/00* | (2016.01) | |
| *F21Y 115/10* | (2016.01) | |
| *G06F 3/16* | (2006.01) | |
| *G10L 15/02* | (2006.01) | |

(Continued)

(52) U.S. Cl.
CPC ............ *F21V 5/007* (2013.01); *F21V 17/105* (2013.01); *G06F 3/167* (2013.01); *G10L 15/02* (2013.01); *H05B 47/11* (2020.01); *H05B 47/17* (2020.01); *H05B 47/18* (2020.01); *F21Y 2105/18* (2016.08); *F21Y 2115/10* (2016.08)

(58) Field of Classification Search
CPC ........ F21V 5/007; F21V 17/105; G06F 3/167; G10L 15/02; H05B 47/11; H05B 47/17; H05B 47/18; F21Y 2105/18; F21Y 2115/10

See application file for complete search history.

(56) References Cited

U.S. PATENT DOCUMENTS

| | | | |
|---|---|---|---|
| 9,249,966 B1* | 2/2016 | Hooi | F21V 29/503 |
| 2017/0234520 A1* | 8/2017 | Yu | F21V 5/04 |
| | | | 362/294 |
| 2021/0102690 A1* | 4/2021 | Zeng | F21S 8/026 |

FOREIGN PATENT DOCUMENTS

CN 219828755 U * 10/2023

OTHER PUBLICATIONS

CN_219828755 machine translation (Year: 2023).*

* cited by examiner

*Primary Examiner* — Tracie Y Green
(74) *Attorney, Agent, or Firm* — Justin Lampel

(57) ABSTRACT

A convenient and easy-to-use LED luminaire capable of adjusting the illumination angle of a light source in a combined manner is provided. The luminaire includes a cover, an upper shell, a lens, a PCB, a battery holder, an iron sheet, a lower shell, a base shell, a magnet, a base cover plate, a detection module, and a control platform. Through the combination of multiple groups of lights and multiple groups of lenses at different angles, the illumination angle of the luminaire can be conveniently changed to concentrate light on a specific area. The control platform adopting a cloud platform remotely controls the luminaire. A brightness adjustment system adopts a brightness estimation model to automatically adjust the brightness of the luminaire. A voice conversion submodule adopts a language model to extract command voice of a user into instruction information.

8 Claims, 3 Drawing Sheets

(51) Int. Cl.
*H05B 47/11* (2020.01)
*H05B 47/115* (2020.01)
*H05B 47/17* (2020.01)
*H05B 47/18* (2020.01)
*F21Y 105/18* (2016.01)

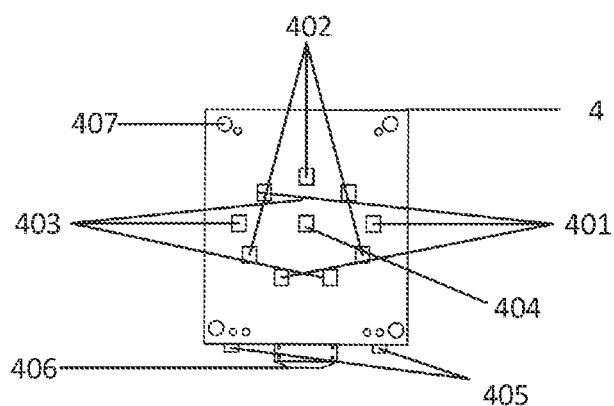
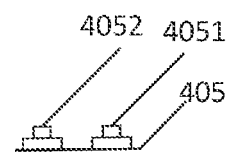
FIG. 5A    FIG. 5B
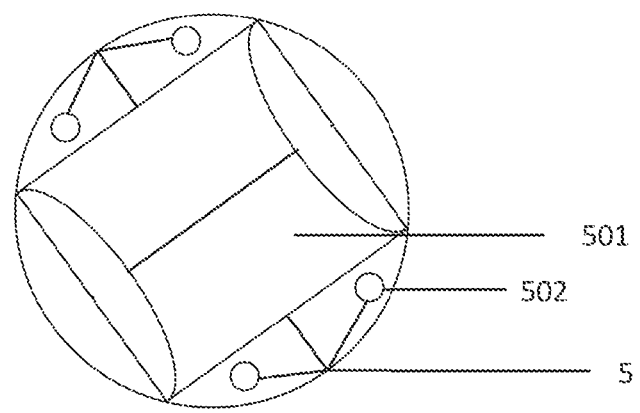
FIG. 6
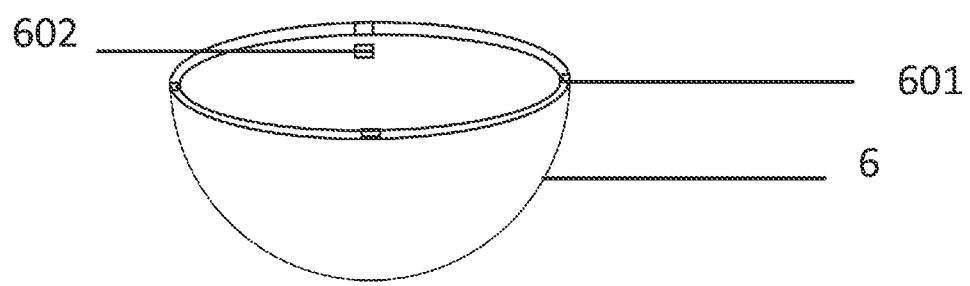
FIG. 7

CONVENIENT AND EASY-TO-USE LED LUMINAIRE CAPABLE OF ADJUSTING ILLUMINATION ANGLE OF LIGHT SOURCE IN COMBINED MANNER

TECHNICAL FIELD

The present invention relates to the field of LED illumination technology, and in particular, to a convenient and easy-to-use LED luminaire capable of adjusting the illumination angle of a light source in a combined manner.

BACKGROUND

Luminaire is a general name for lighting tools, which are divided into chandeliers, desk lamps, wall lamps, floor lamps, etc., and refers to an appliance which can transmit light, distribute the light of a light source and change the light distribution of the light source. With the improvement of people's living standards and the development of well-decorated houses, the demand on luminaires in the market is increasing, and the requirements of consumers are constantly changing as well. Conventional luminaires can no longer meet the requirements of consumers who pay more attention to the appearance of luminaires, the maximum effect of light sources, and the convenience of luminaires in actual use. Conventional luminaires can only adjust the illumination angle by focusing, shading, etc., need to be rotated, stretched or adjusted in other ways to adjust the focal length, or achieve the objective of adjusting the illumination angle of lights and the illuminated area by shading or in other ways that causes the loss of luminous efficacy, cannot conveniently adjust the illumination angle of light sources of luminaires according to the requirements of consumers, and cannot be controlled remotely and by voice.

SUMMARY

In view of the defects of the aforementioned technology, the present invention discloses a convenient and easy-to-use LED luminaire capable of adjusting the illumination angle of a light source in a combined manner, which adopts the combination of multiple groups of lights and multiple groups of lenses at different angles. By adjusting the different groups of lights, the light source can emit light at different angles to conveniently change the illumination angle of the luminaire, so that light can be concentrated on a specific area and a specific bright area. A control platform adopting a cloud platform remotely controls the luminaire, realizing the remote control of the luminaire. A brightness adjustment system adopts a brightness estimation model to automatically adjust the brightness of the luminaire according to the illumination intensity information of the environment around the luminaire. A voice conversion submodule adopts a language model to extract command voice of a user into instruction information, so as to control the luminaire by voice, increasing the convenience of the luminaire in actual use.

In order to achieve the aforementioned technical effects, the present invention adopts the following technical solution:

A convenient and easy-to-use LED luminaire capable of adjusting the illumination angle of a light source in a combined manner comprises a cover 1, an upper shell 2, a lower shell 7, a base shell 8, a magnet 9, and a base cover plate 10, wherein the cover 1 is fixed on the top of the upper shell 2, a lens 3, a printed circuit board (PCB) 4, a battery holder 5 and an iron sheet 6 are arranged in sequence between the upper shell 2 and the lower shell 7, the magnet 9 is fixed between the base shell 8 and the base cover plate 10, and the lower shell 7 is fixed on the base shell 8:

the cover 1 is used to transmit light from the interior of the luminaire;

the cover 1 comprises fasteners 101, which are used to connect the cover 1 with the upper shell 2;

the upper shell 2 is used to protect the internal structure of the luminaire and fix the lens;

the upper shell 2 comprises slots 201, a switch button socket 202, and an adjustment button socket 203, wherein the slots 201 are used to connect the upper shell 2 with the cover 1, the switch button socket 202 is used to accommodate a switch button, and the adjustment button socket 203 is used to accommodate an adjustment button;

the battery holder 5 is used for the installation of batteries and the fixing of the PCB;

the battery holder 5 comprises a battery box 501 and fixing sockets 502, wherein the battery box 501 is used for the installation of the batteries, and the fixing sockets 502 are used to fix the PCB by means of screws;

the iron sheet 6 is used to fix the luminaire on the base shell by means of the magnetic attraction effect;

the lower shell 7 is used to protect the internal structure of the luminaire and fix the battery holder and the iron sheet;

the base shell 8 is used for the placement of the lower shell;

the magnet 9 is used to attract the iron sheet inside the lower shell by means of the magnetic attraction effect;

the base cover plate 10 is used for the stable placement of the luminaire;

the luminaire further comprises a lens 3, a PCB 4, a detection module, and a control platform;

wherein the lens 3 is used to adjust the illumination angle of lights;

the PCB 4 is used to control each module of the luminaire;

the detection module detects the illumination intensity of the environment based on the Internet of Things technology;

the detection module comprises a sensing layer, a transmission layer, and an application layer, wherein the sensing layer comprises an illumination sensor, an infrared detector, and a microphone, the illumination sensor is used to detect illumination information around the luminaire, the microphone is used to collect voice information of a user, the infrared detector is used to detect indoor layout parameters and the height difference between the light source and a desktop, the transmission layer comprises an access layer, a convergence layer, and a core switching layer, the transmission layer is connected to the sensing layer, the sensing layer is connected to the application layer, and the transmission layer is connected to the application layer;

the control platform adopting a cloud platform comprises a login submodule, a mode selection submodule, a data preprocessing submodule, a voice conversion submodule, an adjustment submodule, and a display submodule, wherein the login submodule is used to authenticate the identity of a user and jump to a control interface, the mode selection submodule is used for the user to select an automatic illumination intensity adjustment mode or a manual illumination intensity adjustment mode of the luminaire, the data preprocessing submodule is used to carry out data checking and data sorting on illumination information of the environment surrounding the luminaire and voice information of the user, the voice conversion submodule is used to extract command voice of the user into text information, the adjustment submodule adopts a brightness estimation model to adjust the angle and brightness of the light source, the display submodule is used to display the illumination intensity of the luminaire and the illumination angle of the luminaire, the output end of the login submodule is connected to the input end of the mode selection submodule, the output end of the data preprocessing submodule is connected to the input ends of the adjustment submodule and the voice conversion submodule, the output end of the voice conversion submodule is connected to the input ends of the mode selection submodule and the adjustment submodule, and the mode selection submodule is connected to the adjustment submodule.

As a further technical solution of the present invention, the lens 3 comprises supporting posts 301, a first group of lenses 302, a second group of lenses 303, a third group of lenses 304, and a fourth group of lenses 305, wherein the supporting posts 301 are used to fix the lens 3 in the upper shell 2, the first group of lenses 302 are used to adjust the light angle to 15 degrees, the second group of lenses 303 are used to adjust the light angle to 30 degrees, the third group of lenses 304 are used to adjust the light angle to 45 degrees, and the fourth group of lenses 305 are used to adjust the light angle to 60 degrees.

As a further technical solution of the present invention, the PCB 4 comprises a first group of lights 401, a second group of lights 402, a third group of lights 403, a fourth group of lights 404, buttons 405, a charging port 406, and fixing holes 407, wherein the first group of lights 401 are used to illuminate in combination with the first group of lenses 302, and the second group of lights 402 are used to illuminate in combination with the second group of lenses 303, the third group of lights 403 are used to illuminate in combination with the third group of lenses 304, the fourth group of lights 404 are used to illuminate in combination with the fourth group of lenses 305, the buttons 405 include a luminaire switch button 4051 and an adjustment button 4052, wherein the luminaire switch button 4051 is used to control the on-off state of the lights, the adjustment button 4052 is used for the user to manually adjust the light angle, and the fixing holes 407 fix the PCB 4 on the top of the battery holder 5 by means of screws.

As a further technical solution of the invention, the adjustment submodule comprises an illumination angle adjustment system and a brightness adjustment system, wherein the illumination angle adjustment system is used to control the corresponding group of lights and lenses, and the brightness adjustment system is used to automatically adjust the brightness of the luminaire according to the light intensity information of the environment surrounding the luminaire.

As a further technical solution of the invention, the brightness adjustment system adopts a brightness estimation model, which comprises a brightness attenuation unit and a brightness requirement unit, wherein the brightness attenuation unit is used to evaluate the attenuation degree of the light intensity of the luminaire in the process of indoor irradiation, the brightness requirement unit is used to evaluate the requirement degree of the human eyes for the brightness of the luminaire, and the brightness attenuation unit is connected to the brightness requirement unit.

As a further technical solution of the invention, in the brightness attenuation unit, the luminaire illuminates indoors to form a light spot, the central position of the light spot also shifts the relative luminaire position in the Y-axis direction to a certain extent, the direction angle of light incidence should be the difference between the azimuth angle of the luminaire and the relative direction angle of a desktop normal, the direct light of the lights is reflected by the furniture surface, affecting the brightness of the light spot formed by the direct light of the luminaire, and a luminaire direct light brightness attenuation formula is as follows:

$$E = \int\int \frac{F\lambda z_0^3 \sqrt{(x_1 - x_0)^2 + (y_1 - y_0)^2}}{\pi\left((x_1 - x_0)^2 + (y_1 - y_0)^2 + z_0^2\right)} dxdy \tag{1}$$

In Formula (1), F is basic indoor layout parameters, $\lambda$ is a desktop reflectivity, $x_0$ is an x-axis coordinate of the position of the light spot, $y_0$ is a y-axis coordinate of the position of the light spot, $z_0$ is a z-axis coordinate of the position of the light spot, $x_1$ is an x-axis coordinate of the luminaire, and $y_1$ is a y-axis coordinate of the luminaire.

As a further technical solution of the present invention, the voice conversion submodule adopts a language model, which comprises a feature extraction system and a Kaldi recognition system, wherein the feature extraction system parameterizes sound information in a frequency spectrum in units of frame to obtain a characteristic vector of a signal, the Kaldi recognition system is used to convert the characteristic vector of the voice signal into a control instruction, and the output end of the feature extraction system is connected to the input end of the Kaldi recognition system.

As a further technical solution of the present invention, a control interface of the control platform adopting the cloud platform is designed through the WebSocket protocol, and in the remote control of the luminaire through a B/S architecture, the two-way communication between the luminaire and the control platform is implemented through the Socket.io framework.

The present invention has the following beneficial positive effects:

Different from conventional LED luminaires, the present invention discloses a convenient and easy-to-use LED luminaire capable of adjusting the illumination angle of a light source in a combined manner, which adopts the combination of the multiple groups of lights and the multiple groups of lenses at different angles. By adjusting the different groups of lights, the light source can emit light at different angles to conveniently change the illumination angle of the luminaire, so that light can be concentrated on a specific area and a specific bright area. The control platform adopting the cloud platform remotely controls the luminaire, realizing the remote control of the luminaire. The brightness adjustment system adopts the brightness estimation model to automatically adjust the brightness of the luminaire according to the illumination intensity information of the environment around the luminaire. The voice conversion submodule adopts the language model to extract command voice of the user into instruction information, so as to control the luminaire by voice, increasing the convenience of the luminaire in actual use.

BRIEF DESCRIPTION OF THE DRAWINGS

In order to more clearly illustrate the technical solution in embodiments of the present invention or the prior art, the accompanying drawings which need to be used in the description of the embodiments or the prior art will be introduced briefly below. Apparently, the accompanying drawings described below are merely some embodiments of the present invention, and those of ordinary skill in the art can also obtain other accompanying drawings according to these drawings without making creative efforts. Among the accompanying drawings:

FIGS. 5A and 5B show a schematic structural diagram of a PCB according to the present invention;

FIG. 6 is a schematic structural diagram of a battery holder according to the present invention; and FIG. 7 is a schematic structural diagram of a lower shell according to the present invention.

REFERENCE NUMERALS

1—Cover; 2—Upper shell; 3—Lens; 4—PCB; 5—Battery holder; 6—Iron sheet; 7—Lower shell; 8—Base shell; 9—Magnet; 10—Base cover plate; 101—Fastener; 201—Slot; 202—Switch button socket; 203—Adjustment button socket; 301—Supporting post; 302—First group of lenses; 303—Second group of lenses; 304—Third group of lenses; 305—Fourth group of lenses; 401—First group of lights; 402—Second group of lights; 403—Third group of lights; 404—Fourth group of lights; 405—Button; 406—Charging port; 407—Fixing hole; 4051—Luminaire switch button; 4052—Adjustment button.

DETAILED DESCRIPTION OF THE EMBODIMENTS

The technical solutions in the embodiments herein will be clearly and completely described below with reference to the drawings in the embodiments herein, and it is obvious that the described embodiments are only a part of the embodiments herein but not all of them. It should be understood that these descriptions are merely exemplary rather than intended to limit the scope of the present invention. In addition, descriptions of well-known structures and technologies are omitted in the following description in order to avoid the unnecessary confusion of the concept of the present invention.

Figure 1:
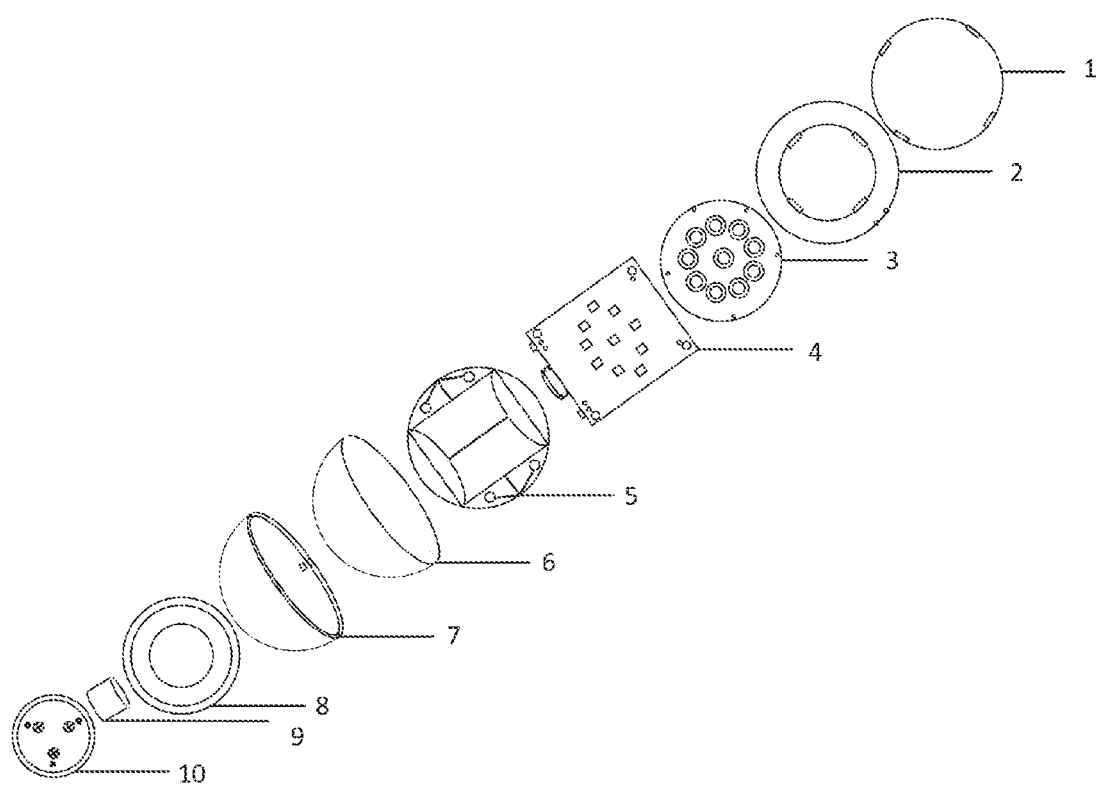
FIG. 1 is a schematic diagram of an overall architecture of a convenient and easy-to-use LED luminaire capable of adjusting the illumination angle of a light source in a combined manner according to the present invention.
Figure 2:
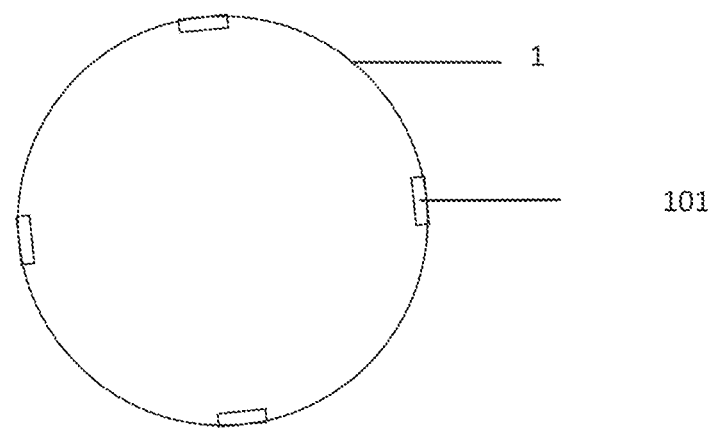
FIG. 2 is a schematic structural diagram of a cover according to the present invention.
Figure 3:
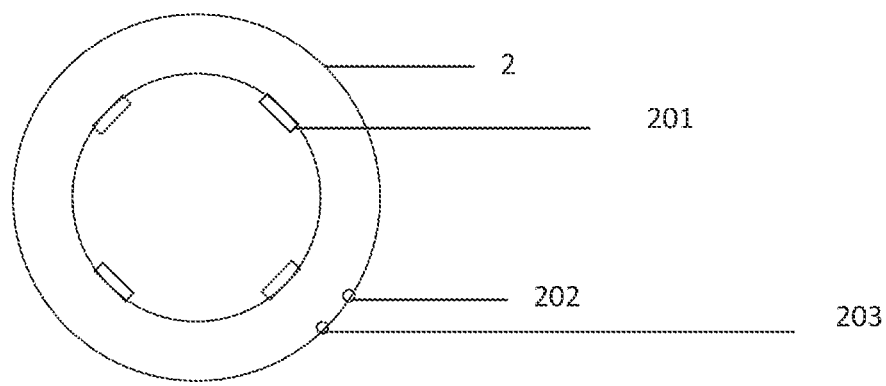
FIG. 3 is a schematic structural diagram of an upper shell according to the present invention.
Figure 4:
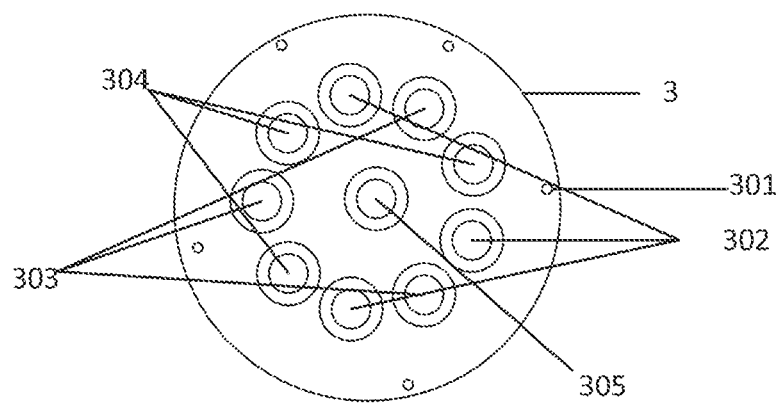
FIG. 4 is a schematic structural diagram of a lens according to the present invention.

As shown in FIGS. 1-4, 5A-5B, and 6-7, a convenient and easy-to-use LED luminaire capable of adjusting the illumination angle of a light source in a combined manner includes a cover 1, an upper shell 2, a lower shell 7, a base shell 8, a magnet 9, and a base cover plate 10, the cover 1 is fixed on the top of the upper shell 2, a lens 3, a PCB 4, a battery holder 5 and an iron sheet 6 are arranged in sequence between the upper shell 2 and the lower shell 7, the magnet 9 is fixed between the base shell 8 and the base cover plate 10, and the lower shell 7 is fixed on the base shell 8;

the cover 1 is used to transmit light from the interior of the luminaire;

the cover 1 includes fasteners 101, which are used to connect the cover 1 with the upper shell 2;

the upper shell 2 is used to protect the internal structure of the luminaire and fix the lens;

the upper shell 2 includes slots 201, a switch button socket 202, and an adjustment button socket 203, the slots 201 are used to connect the upper shell 2 with the cover 1, the switch button socket 202 is used to accommodate a switch button, and the adjustment button socket 203 is used to accommodate an adjustment button;

the battery holder 5 is used for the installation of batteries and the fixing of the PCB;

the battery holder 5 includes a battery box 501 and fixing sockets 502, the battery box 501 is used for the installation of the batteries, and the fixing sockets 502 are used to fix the PCB by means of screws;

the iron sheet 6 is used to fix the luminaire on the base shell by means of the magnetic attraction effect;

the lower shell 7 is used to protect the internal structure of the luminaire and fix the battery holder and the iron sheet;

the base shell 8 is used for the placement of the lower shell;

the magnet 9 is used to attract the iron sheet inside the lower shell by means of the magnetic attraction effect;

the base cover plate 10 is used for the stable placement of the luminaire;

the luminaire further includes a lens 3, a PCB 4, a detection module, and a control platform;

wherein the lens 3 is used to adjust the illumination angle of lights;

the PCB 4 is used to control each module of the luminaire;

the detection module detects the illumination intensity of the environment based on the Internet of Things technology;

the detection module comprises a sensing layer, a transmission layer, and an application layer, wherein the sensing layer comprises an illumination sensor, an infrared detector, and a microphone, the illumination sensor is used to detect illumination information around the luminaire, the microphone is used to collect voice information of a user, the infrared detector is used to detect indoor layout parameters and the height difference between the light source and a desktop, the transmission layer comprises an access layer, a convergence layer, and a core switching layer, the transmission layer is connected to the sensing layer, the sensing layer is connected to the application layer, and the transmission layer is connected to the application layer;

the control platform adopting a cloud platform includes a login submodule, a mode selection submodule, a data preprocessing submodule, a voice conversion submodule, an adjustment submodule, and a display submodule, the login submodule is used to authenticate the identity of a user and jump to a control interface, the mode selection submodule is used for the user to select an automatic illumination intensity adjustment mode or a manual illumination intensity adjustment mode of the luminaire, the data preprocessing submodule is used to carry out data checking and data sorting on illumination information of the environment surrounding the luminaire and voice information of the user, the voice conversion submodule is used to extract command voice of the user into text information, the adjustment submodule adopts a brightness estimation model to adjust the angle and brightness of the light source, the display submodule is used to display the illumination intensity of the luminaire and the illumination angle of the luminaire, the output end of the login submodule is connected to the input end of the mode selection submodule, the output end of the data preprocessing submodule is connected to the input ends of the adjustment submodule and the voice conversion submodule, the output end of the voice conversion submodule is connected to the input ends of the mode selection submodule and the adjustment submodule, and the mode selection submodule is connected to the adjustment submodule.

In a specific embodiment, the lens 3 includes supporting posts 301, a first group of lenses 302, a second group of lenses 303, a third group of lenses 304, and a fourth group of lenses 305, the supporting posts 301 are used to fix the lens 3 in the upper shell 2, the first group of lenses 302 are used to adjust the light angle to 15 degrees, the second group of lenses 303 are used to adjust the light angle to 30 degrees, the third group of lenses 304 are used to adjust the light angle to 45 degrees, and the fourth group of lenses 305 are used to adjust the light angle to 60 degrees.

In the aforementioned embodiment, the PCB 4 includes a first group of lights 401, a second group of lights 402, a third group of lights 403, a fourth group of lights 404, buttons 405, a charging port 406, and fixing holes 407, the first group of lights 401 are used to illuminate in combination with the first group of lenses 302, and the second group of lights 402 are used to illuminate in combination with the second group of lenses 303, the third group of lights 403 are used to illuminate in combination with the third group of lenses 304, the fourth group of lights 404 are used to illuminate in combination with the fourth group of lenses 305, the buttons 405 include a luminaire switch button 4051 and an adjustment button 4052, the luminaire switch button 4051 is used to control the on-off state of the lights, the adjustment button 4052 is used for the user to manually adjust the light angle, and the fixing holes 407 fix the PCB 4 on the top of the battery holder 5 by means of screws.

In the aforementioned embodiment, if the luminaire adopts an illumination angle of 15 degrees, the first group of lights 401 are used to illuminate in combination with the first group of lenses 302; if the luminaire adopts an illumination angle of 30 degrees, the second group of lights 402 are used to illuminate in combination with the second group of lenses 303; if the luminaire adopts an illumination angle of 45 degrees, the third group of lights 403 are used to illuminate in combination with the third group of lenses 304; or if the luminaire adopts an illumination angle of 60 degrees, the fourth group of lights 404 are used to illuminate in combination with the fourth group of lenses 305.

In a specific embodiment, the adjustment submodule includes an illumination angle adjustment system and a brightness adjustment system, the illumination angle adjustment system is used to control the corresponding group of lights and lenses, and the brightness adjustment system is used to automatically adjust the brightness of the luminaire according to the light intensity information of the environment surrounding the luminaire.

In a specific embodiment, the brightness adjustment system adopts a brightness estimation model, which includes a brightness attenuation unit and a brightness requirement unit, the brightness attenuation unit is used to evaluate the attenuation degree of the light intensity of the luminaire in the process of indoor irradiation, the brightness requirement unit is used to evaluate the requirement degree of the human eyes for the brightness of the luminaire, and the brightness attenuation unit is connected to the brightness requirement unit.

In the aforementioned embodiment, brightness requirement values which are set by the brightness requirement unit in the four seasons are: 300lx in summer, 325lx in spring and autumn, and 350lx in winter.

In a specific embodiment, in the brightness attenuation unit, the luminaire illuminates indoors to form a light spot, the central position of the light spot also shifts the relative luminaire position in the Y-axis direction to a certain extent, the direction angle of light incidence should be the difference between the azimuth angle of the luminaire and the relative direction angle of a desktop normal, the direct light of the lights is reflected by the furniture surface, affecting the brightness of the light spot formed by the direct light of the luminaire, and a luminaire direct light brightness attenuation formula is as follows:

$$E = \int\int \frac{F\lambda z_0^3 \sqrt{(x_1-x_0)^2 + (y_1-y_0)^2}}{\pi\left((x_1-x_0)^2 + (y_1-y_0)^2 + z_0^2\right)} dxdy \quad (1)$$

In Formula (1), F is indoor layout parameters, $\lambda$ is a desktop reflectivity, $x_0$ is an x-axis coordinate of the position of the light spot, $y_0$ is a y-axis coordinate of the position of the light spot, $z_0$ is a z-axis coordinate of the position of the light spot, $x_1$ is an x-axis coordinate of the luminaire, and $y_1$ is a y-axis coordinate of the luminaire.

TABLE 1

Reflectivities of Materials

| Material | | Reflectivity |
|---|---|---|
| metal | chromium | 60-65 |
| | aluminum plate | 60-85 |
| | stainless steel | 55-65 |
| glass | frosted | 0.28-0.33 |
| | ordinary | 0.08 |
| brick | marble | 30-70 |
| wood | birch | 35-50 |
| | peach wood | 6-12 |
| | oak | 10-15 |

In the aforementioned embodiment, the indoor layout parameters include the height from the light source of the luminaire to the desktop and the length, width and height of a room. The reflectivity of the desktop is shown in Table 1. A light spot formed by the luminaire indoors reflects light to the surrounding environment, with the brightness of irradiation in all directions being substantially uniform, so this light spot can be regarded as a Lambert irradiation source approximately. The attenuated brightness of the luminaire is calculated by Formula (1).

In a specific embodiment, the voice conversion submodule adopts a language model, which includes a feature extraction system and a Kaldi recognition system, the feature extraction system parameterizes sound information in a frequency spectrum in units of frame to obtain a characteristic vector of a signal, the Kaldi recognition system is used to convert the characteristic vector of the voice signal into a control instruction, and the output end of the feature extraction system is connected to the input end of the Kaldi recognition system.

In the aforementioned embodiment, the operating mode of the feature extraction system is as follows: preprocessed voice information is framed and windowed first; Fourier transform is then carried out on voice segment information; a Mel filter bank is then applied, and the logarithmic energy in each filter is obtained as a coefficient; a Hertz frequency is converted into a Mel frequency; and finally, discrete cosine transform is carried out to obtain feature vectors of the voice information.

In the aforementioned embodiment, the operating mode of the Kaldi recognition system is as follows: the feature vectors of the voice information are differentiated; the differential features of front and rear frames are calculated within the window length and added to the current features; the front frame and the rear frame are then spliced; input acoustic features are then normalized to make them normally distributed after transformation; the mean variance is normalized to implement the transformation of the feature vectors of the voice information; and finally, the voice of the user is matched according to instruction information in a database to obtain a corresponding voice instruction.

In a specific embodiment, the control interface of the control platform adopting the cloud platform is designed through the WebSocket protocol, and in the remote control of the luminaire through a B/S architecture, the two-way communication between the luminaire and the control platform is implemented through the Socket.io framework.

In a specific embodiment, the user logs into the control platform through a mobile phone.

Although the specific embodiments of the present invention have been described above, those skilled in the art should understand that these specific embodiments are merely illustrative, and those skilled in the art can make various omissions, replacements and changes to the details of the aforementioned method and system without departing from the principle and essence of the present invention. For example, it is within the scope of the present invention to combine the aforementioned method steps so as to perform substantially the same function according to substantially the same method to achieve substantially the same result. Therefore, the scope of the present invention is defined only by the appended claims.

What is claimed is:

1. A convenient and easy-to-use LED luminaire capable of adjusting an illumination angle of a light source in a combined manner, comprising a cover, an upper shell, a lower shell, a base shell, a magnet, and a base cover plate, wherein the cover is fixed on a top of the upper shell, a lens, a printed circuit board (PCB), a battery holder and an iron sheet are arranged in sequence between the upper shell and the lower shell, the magnet is fixed between the base shell and the base cover plate, and the lower shell is fixed on the base shell;

the cover is configured to transmit light from an interior of the luminaire;

the cover comprises fasteners, wherein the fasteners are configured to connect the cover with the upper shell;

the upper shell is configured to protect an internal structure of the luminaire and fix the lens;

the upper shell comprises slots, a switch button socket, and an adjustment button socket, wherein the slots are configured to connect the upper shell with the cover, the switch button socket is configured to accommodate a switch button, and the adjustment button socket is configured to accommodate an adjustment button;

the battery holder is configured for an installation of batteries and a fixing of the PCB;

the battery holder comprises a battery box and fixing sockets, the battery box is configured for the installation of the batteries, and the fixing sockets are configured to fix the PCB by means of screws;

the iron sheet is configured to fix the luminaire on the base shell by means of a magnetic attraction effect;

the lower shell is configured to protect the internal structure of the luminaire and fix the battery holder and the iron sheet;

the base shell is configured for a placement of the lower shell;

the magnet is configured to attract the iron sheet inside the lower shell by means of the magnetic attraction effect;

the base cover plate is configured for a stable placement of the luminaire;

the LED luminaire further comprises the lens, the PCB, a detection module, and a control platform;

the lens is configured to adjust the illumination angle of lights;

the PCB is configured to control each module of the luminaire;

the detection module detects an illumination intensity of the environment based on the Internet of Things technology;

the detection module comprises a sensing layer, a transmission layer, and an application layer, wherein the sensing layer comprises an illumination sensor, an infrared detector, and a microphone, the illumination sensor is configured to detect illumination information around the luminaire, the microphone is configured to collect voice information of a user, the infrared detector is configured to detect indoor layout parameters and a height difference between the light source and a desktop, the transmission layer comprises an access layer, a convergence layer, and a core switching layer, the transmission layer is connected to the sensing layer, the sensing layer is connected to the application layer, and the transmission layer is connected to the application layer;

the control platform adopting a cloud platform comprises a login submodule, a mode selection submodule, a data preprocessing submodule, a voice conversion submodule, an adjustment submodule, and a display submodule, wherein the login submodule is configured to authenticate an identity of the user and jump to a control interface, the mode selection submodule is configured for the user to select an automatic illumination intensity adjustment mode or a manual illumination intensity adjustment mode of the luminaire, the data preprocessing submodule is configured to carry out data checking and data sorting on the illumination information of the environment surrounding the luminaire and the voice information of the user, the voice conversion submodule is configured to extract a command voice of the user into text information, the adjustment submodule adopts a brightness estimation model to adjust an angle and brightness of the light source, the display submodule is configured to display the illumination intensity of the luminaire and the illumination angle of the luminaire, an output end of the login submodule is connected to an input end of the mode selection submodule, an output end of the data preprocessing submodule is connected to input ends of the adjustment submodule and the voice conversion submodule, an output end of the voice conversion submodule is connected to the input ends of the mode selection submodule and the adjustment submodule, and the mode selection submodule is connected to the adjustment submodule.

2. The convenient and easy-to-use LED luminaire according to claim 1, wherein the lens comprises supporting posts, a first group of lenses, a second group of lenses, a third group of lenses, and a fourth group of lenses, wherein the supporting posts are configured to fix the lens in the upper shell, the first group of lenses are configured to adjust a light angle to 15 degrees, the second group of lenses are configured to adjust the light angle to 30 degrees, the third group of lenses are configured to adjust the light angle to 45 degrees, and the fourth group of lenses are configured to adjust the light angle to 60 degrees.

3. The convenient and easy-to-use LED luminaire according to claim 2, wherein the PCB comprises a first group of lights, a second group of lights, a third group of lights, a fourth group of lights, buttons, a charging port, and fixing holes, wherein the first group of lights are configured to illuminate in combination with the first group of lenses, and the second group of lights are configured to illuminate in combination with the second group of lenses, the third group of lights are configured to illuminate in combination with the third group of lenses, the fourth group of lights are configured to illuminate in combination with the fourth group of lenses, the buttons comprise a luminaire switch button and an adjustment button, wherein the luminaire switch button is configured to control an on-off state of the lights, the adjustment button is configured for the user to manually adjust the light angle, and the fixing holes fix the PCB on a top of the battery holder by means of screws.

4. The convenient and easy-to-use LED luminaire according to claim 3, wherein the adjustment submodule comprises an illumination angle adjustment system and a brightness adjustment system, wherein the illumination angle adjustment system is configured to control the corresponding group of lights and lenses, and the brightness adjustment system is configured to automatically adjust a brightness of the luminaire according to a light intensity information of the environment surrounding the luminaire.

5. The convenient and easy-to-use LED luminaire according to claim 4, wherein the brightness adjustment system adopts a brightness estimation model, the brightness estimation model comprises a brightness attenuation unit and a brightness requirement unit, wherein the brightness attenuation unit is configured to evaluate an attenuation degree of the light intensity of the luminaire in a process of indoor irradiation, the brightness requirement unit is configured to evaluate a requirement degree of human eyes for the brightness of the luminaire, and the brightness attenuation unit is connected to the brightness requirement unit.

6. The convenient and easy-to-use LED luminaire according to claim 5, wherein in the brightness attenuation unit, the luminaire illuminates indoors to form a light spot, a central position of the light spot further shifts a relative luminaire position in a Y-axis direction to a predetermined extent, a direction angle of light incidence should be a difference between an azimuth angle of the luminaire and a relative direction angle of a desktop normal, a direct light of the lights is reflected by a furniture surface, affecting a brightness of the light spot formed by a direct light of the luminaire, and a luminaire direct light brightness attenuation formula is as follows:

$$E = \int\int \frac{F\lambda z_0^3 \sqrt{(x_1-x_0)^2 + (y_1-y_0)^2}}{\pi\left((x_1-x_0)^2 + (y_1-y_0)^2 + z_0^2\right)} dxdy \quad (1)$$

wherein F is indoor layout parameters, $\lambda$ is a desktop reflectivity, $x_0$ is an x-axis coordinate of a position of the light spot, $y_0$ is a y-axis coordinate of the position of the light spot, $z_0$ is a z-axis coordinate of the position of the light spot, $x_1$ is an x-axis coordinate of the luminaire, and $y_1$ is a y-axis coordinate of the luminaire.

7. The convenient and easy-to-use LED luminaire according to claim 1, wherein the voice conversion submodule adopts a language model, the language model comprises a feature extraction system and a Kaldi recognition system, wherein the feature extraction system parameterizes sound information in a frequency spectrum in units of frame to obtain a characteristic vector of a signal, the Kaldi recognition system is configured to convert the characteristic vector of the voice signal into a control instruction, and an output end of the feature extraction system is connected to an input end of the Kaldi recognition system.

8. The convenient and easy-to-use LED luminaire according to claim 1, wherein the control interface of the control platform adopting the cloud platform is designed through a WebSocket protocol, and in a remote control of the luminaire through a B/S architecture, a two-way communication between the luminaire and the control platform is implemented through a Socket.io framework.

* * * * *